United States Patent Office 2,848,505
Patented Aug. 19, 1958

2,848,505

PROCESS FOR ZINC CHLORIDE ACTIVATING A DEHALOGENATION REACTION

William T. Miller, Ithaca, N. Y., assignor to the United States of America as represented by the United States Atomic Energy Commission No Drawing. Application February 25, 1953
Serial No. 338,921

6 Claims. (Cl. 260—653)

This invention relates to the dehalogenation of a halogen-containing compound. In one of its aspects, this invention relates to the dechlorination of a halocarbon. In one of its more particular aspects, this invention relates to the dechlorination of trifluorotrichloroethane to produce chlorotrifluoroethylene.

This application is a continuation-in-part of my prior and copending application Serial No. 74,809, filed February 5, 1949, now U. S. Patent 2,636,907, which refers to application Serial No. 14,797, filed March 13, 1948, now Patent No. 2,579,437, and discloses a method for polymerizing perhalo-olefins, particularly chlorotrifluoroethylene.

Intermediate compounds of significant industrial importance are prepared by the dehalogenation of saturated halocarbons. For example, polytrifluorochloroethylene is prepared by the polymerization of trifluorochloroethylene an intermediate which is obtained by the dechlorination of trifluorotrichloroethane.

It is an object of this invention to provide an improved method for the dehalogenation of halocarbons.

Another object of this invention is to provide a method of dehalogenation which is easily controlled.

It is a still further object of this invention to provide an improved method for starting up dehalogenation reactions which, when started, continue at an efficient rate and without violence.

It is one of the particular objects of this invention to provide an easily controlled and readily effected process for the dechlorination of trifluorotrichloroethane, to produce trifluorochloroethylene.

Various other objects of the present invention will become apparent to those skilled in the art from the accompanying description and disclosure.

As herein employed, "halocarbons" are defined as compounds consisting substantially exclusively of carbon and halogen with any degree of saturation. "Perfluorochloro-olefin" is defined as a halocarbon, particularly a perhalo-olefin with any degree of unsaturation, consisting of fluorine, carbon, and as regards this invention no more than one chlorine atom per atom of carbon.

Saturated halocarbons can be dehalogenated, such as dechlorinated, under suitable conditions in the presence of a solvent and a metallic dehalogenating agent to produce a perhalo-olefin. Various solvents may be used, but in general, the solvent should be substantially completely miscible with the halocarbon that is to be dehalogenated and also must be capable of dissolving the metal halide which is formed in the dehalogenation reaction by the metallic dehalogenating agent. A number of metallic dehalogenating agents may be used such as, tin, magnesium, iron, zinc and aluminum. Zinc is a preferred dehalogenating agent.

Some difficulty has been experienced in dehalogenating compounds by the process outlined above. At times, difficulty was experienced in starting up the reaction. At other times, the reaction occurred spontaneously, and with explosive violence such that the safety discs on the reaction chamber were ruptured. This anamolous behavior is believed due to the presence, on the surface of the metallic dehalogenating agent, of a coating of metal oxide which tends to inhibit the reaction.

I have found that by adding a quantity of a metal halide such as, zinc chloride, to the reaction mixture, that the reaction starts quickly and proceeds smoothly with no manifestation of the aforementioned difficulties.

For a better understanding of my invention, its use will be described in terms of the dechlorination of trifluorotrichloroethane to produce trifluorochloroethylene. It is to be understood and will be clearly apparent to those skilled in the art that the process of this invention may be applied equally well to the dehalogenation of any halocarbon, such as dichlorotetrafluoroethane to tetrafluoroethylene, tetrachlorodifluoroethane to dichlorodifluoroethylene and dichloroperfluoropropane to perfluoropropene.

Trichlorotrifluoroethane, of the 1,2,2 chloro structure which may be obtained on the open market as Freon 113, is introduced into a suitable dehalogenation chamber. A dechlorinating agent, such as, metallic zinc dust, is also introduced into the chamber. Fresh solvent for dissolving the metal halide formed in the dehalogenator is also continuously or intermittently introduced into the dehalogenator. In this discussion the solvent used is methyl alcohol. The amount of metal dechlorinaing agent introduced into the dehalogenator is at least that amount necessary for the removal of two halogen atoms from the halocarbon. Preferably, an excess dechlorinating agent is used in affecting the dechlorination reaction and the excess may be as much as 100% or more. It is desirable to have an amount of solvent equivalent in weight to the halocarbon but the amount may vary depending upon the reaction conditions. Quantities are generally less for operations at superatmospheric than for atmospheric pressures.

To the above reaction chamber is added a metal halide such as zinc chloride. Generally the metal halide added will correspond to the metal dehalogenating agent employed and also to the type of dehalogenation. Thus, where a dechlorination is effected by the use of zinc, the metal halide added is preferably zinc chloride. Other metal halides may be added differing in the metal and/or the halogen from the metal dehalogenating agent and/or the type of dehalogenation and their use is contemplated in this invention. For example, in the dechlorination of Freon 113 with zinc, zinc fluoride, zinc bromide, ferric chloride, ferric fluoride, stannic chloride, stannic fluoride, alone or in admixture may be added. Preferably, the halogen of the metal halide is a normally gaseous halogen. The metal halide is added in quantities between about 0.1 and about 10 percent, preferably in quantities between about 0.5 and about 2% based on the weight of metal dehalogenating agent. The metal halide may be added separately or in admixture with the solvent.

For the dechlorination of trifluorotrichloroethane to produce trifluorochloroethylene pressures between about atmospheric and about 400 pounds per square inch gauge may be employed. Preferably, a pressure between about 120 and about 200 pounds per square inch gauge and a particularly suitable pressure of about 180 pounds per square inch gauge, so that trifluorotrichloroethane is maintained in liquid phase. In the preferred form of the invention, the pressure should be sufficiently low at any given temperature to permit vaporization of the trifluorochloroethylene from the material to be dehalogenated; which is maintained in liquid phase in the dehalogenator. A suitable temperature for the dehalogenation is between about 0° C. and about 200° C. It is preferred to use a temperature between about 40 and about 150° C. usually about 70 to 100° C. At higher temperatures, the rate of reaction is increased which in most instances is desirable. However, excessive temperatures cause undesirable side reactions. It should be pointed out that, by the process of this invention, operations are successfully conducted in the lower temperatures of the above ranges, since the metal halide promoter tends to increase the reaction rate.

Suitable solvents for the dehalogenation step comprise methyl, ethyl, n-propyl, n-butyl alcohols; dioxane, glycerol, butyl-carbitol and the Cellosolves. Other known solvents complying with the general requirements may be used, if desired, without departing from the scope of this invention. The preferred solvents are methyl and ethyl alcohol.

Since the temperature and pressure conditions which are maintained in the dehalogenator are such that the perhalo-olefin formed therein as the desired product is vaporized, the olefin passes upward together with entrained and vaporized saturated halocarbons and solvent into a rectification column wherein entrained contaminants are condensed and returned to the reactor. Detailed description of the purification of perhalo-olefins obtained by the use of metal dehalogenating agents may be found in my Patent No. 2,579,437, filed March 13, 1948.

An illustrative example of the application of the process of this invention is given below. This illustration is offered for a better understanding of the invention and is not to be construed as unnecessarily limiting.

*Example*

About 500 grams of 1,2,2 trichlorotrifluoroethane (Freon 113) and about 175 grams of metallic zinc are added to the dehalogenation reactor. In addition, about 100 ml. of methyl alcohol containing about 1.5 grams of zinc chloride is added to the aforementioned reactor. The reactor and its contents is maintained at a temperature of about 70° C. and at a pressure of about 180 pounds per square inch gauge. The resulting mixture in the reactor is vigorously agitated by conventional techniques. Trifluorochloroethylene is removed overhead, collected and subsequently purified.

Having described my invention, I claim:

1. In a process for dechlorinating trifluorotrichloroethane with metallic zinc and an alcohol, the improvement of the process which comprises introducing trifluorotrichloroethane, an alcohol, metallic zinc and zinc chloride into a dehalogenation zone, said zinc chloride being introduced in quantities between about 0.1 and about 10 percent based on the weight of metallic zinc, maintaining said zone and contents at a temperature between about 0° C. and about 200° C. and at a pressure sufficient to maintain trifluorotrichloroethane in the liquid phase and removing a vaporous overhead fraction comprising trifluorochloroethylene as a product of the process.

2. In a process for dechlorinating a fluorochloroalkane containing from 2 to 3 carbon atoms with metallic zinc and an alcohol, the improvement of the process which comprises introducing said fluorochloroalkane, an alcohol, metallic zinc, and zinc chloride into a dehalogenation zone, maintaining said zone and contents at a temperature and pressure sufficient to maintain said fluorochloroalkane in liquid phase and removing a vaporous overhead fraction comprising the corresponding fluorine-containing olefin as a product of the process.

3. The process of claim 2 in which the fluorochloroalkane is tetrachlorodifluoroethane.

4. The process of claim 2 in which the fluorochloroalkane is dichloroperfluoropropane.

5. The process of claim 2 in which the fluorochloroalkane is trifluorotrichloroethane.

6. In a process for dechlorinating a fluorochloroalkane containing from 2 to 3 carbon atoms with a metal dechlorinating agent and a metal chloride solvent in a dechlorination zone, the improvement which comprises introducing into said dechlorination zone in addition to the aforesaid materials a metal chloride corresponding to the metal of the dehalogenating agent.

References Cited in the file of this patent

UNITED STATES PATENTS

| | | |
|---|---|---|
| 2,344,061 | Renoll | Mar. 14, 1944 |
| 2,590,433 | Blum | Mar. 25, 1952 |
| 2,635,121 | Smith et al. | Apr. 14, 1953 |